(12) United States Patent
Mewhort

(10) Patent No.: US 11,651,296 B1
(45) Date of Patent: May 16, 2023

(54) GUEST INITIATED CHECKOUT DEVICE, GUEST INITIATED ACCOMMODATIONS CHECKOUT SYSTEM, AND ASSOCIATED GUEST INITIATED ACCOMMODATIONS CHECKOUT PROCESSES WHICH ALLOW GUEST TO COMMUNICATE ACCOMMODATIONS CHECKOUT

(71) Applicant: Curtis John Mewhort, Seattle, WA (US)

(72) Inventor: Curtis John Mewhort, Seattle, WA (US)

( * ) Notice: Subject to any disclaimer, the term of this patent is extended or adjusted under 35 U.S.C. 154(b) by 729 days.

(21) Appl. No.: 16/599,878

(22) Filed: Oct. 11, 2019

Related U.S. Application Data

(60) Provisional application No. 62/781,020, filed on Dec. 18, 2018.

(51) Int. Cl.
| | | |
|---|---|---|
| *G06Q 10/02* | (2012.01) | |
| *G06Q 50/12* | (2012.01) | |
| *G10L 15/18* | (2013.01) | |
| *G10L 15/22* | (2006.01) | |
| *H04L 65/00* | (2022.01) | |
| *H04L 65/40* | (2022.01) | |
| *H04L 51/06* | (2022.01) | |

(52) U.S. Cl.
CPC .............. *G06Q 10/02* (2013.01); *G06Q 50/12* (2013.01); *G10L 15/1815* (2013.01); *G10L 15/22* (2013.01); *H04L 51/06* (2013.01); *H04L 65/00* (2013.01); *H04L 65/40* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2010/0191551 A1* | 7/2010 | Drance | G06Q 10/02 705/5 |
| 2018/0211666 A1* | 7/2018 | Kolavennu | H04L 12/2816 |
| 2019/0236495 A1* | 8/2019 | Krause | G06Q 50/12 |

FOREIGN PATENT DOCUMENTS

| | | | | |
|---|---|---|---|---|
| WO | WO-2020194065 A1 * | 10/2020 | | G06F 3/0482 |

OTHER PUBLICATIONS

Robert McCauley, "Using Alexa Skills Kit and AWS IoT to Voice Control Connected Devices" May 3, 2016 (Year: 2016).*

(Continued)

*Primary Examiner* — Shannon S Campbell
*Assistant Examiner* — David G. Godbold
(74) *Attorney, Agent, or Firm* — Plager Schack LLP; Mark H. Plager; Stephen Hallberg

(57) ABSTRACT

A guest initiated checkout device, a guest initiated accommodations checkout system, and associated guest initiated accommodations checkout processes are disclosed in which use of a button or voice-activated device allows guests to easily communicate that they are checking out of their accommodations. Specifically, a guest initiated checkout device—either a button or a voice-activated device—that is conveniently located in guest accommodations for a guest to use when checking out and which initiates communication with a software system to send out communication to people and other systems informing them that guest checkout has commenced as triggered by activation of the guest initiated checkout device.

8 Claims, 5 Drawing Sheets

(56) References Cited

OTHER PUBLICATIONS

Hospitality Technology, "Amazon CTO Discusses Potential of Amazon Alexa in Hotel Rooms at AWS re:Invent" Dec. 4, 2017 (Year: 2017).*

Karan Desai, "One-Click Check-In/Check-Out for Airbnb guests using an AWS IoT Button" Jun. 29, 2017 (Year: 2017).*

* cited by examiner

US 11,651,296 B1

GUEST INITIATED CHECKOUT DEVICE, GUEST INITIATED ACCOMMODATIONS CHECKOUT SYSTEM, AND ASSOCIATED GUEST INITIATED ACCOMMODATIONS CHECKOUT PROCESSES WHICH ALLOW GUEST TO COMMUNICATE ACCOMMODATIONS CHECKOUT

CLAIM OF BENEFIT TO PRIOR APPLICATION

This application claims benefit to U.S. Provisional Patent Application 62/781,020, entitled "Use of a button or voice-activated device to allows guests to easily communicate that they are checking out of their accommodations," filed Dec. 18, 2018. The U.S. Provisional Patent Application 62/781,020 is incorporated herein by reference.

BACKGROUND

Embodiments of the invention described in this specification relate generally to hospitality systems, and more particularly, to a guest initiated checkout device comprising one of a button and a voice-activated device that is conveniently located in guest accommodations for a guest to use when checking out and which initiates communication with a software system to send out communication to people and other systems informing them that guest checkout has commenced as triggered by activation of the guest initiated checkout device.

There are many activities (maintenance, cleaning, replenishing, etc.) which need to be performed after a guest's checkout of accommodations. In most cases, the personnel who perform these activities wait for the designated checkout time and have a small window to complete them before the next check in.

To checkout of their accommodations, guests will either checkout formally at the checkout desk or in the expected manner or simply leave on the day of checkout at or before some designated checkout time. Activities that need to be performed after guests leave can be performed sooner when it is known that guests have checked out. However, guests often will not communicate when they are leaving their accommodations. For guests to be willing to help with communicating that they are leaving, it needs to be very easy for them.

Therefore, what is needed is a way for guests to trigger post-checkout activities upon guest initiated checkout from their accommodations.

BRIEF DESCRIPTION

A novel guest initiated checkout device, a novel guest initiated accommodations checkout system, and associated guest initiated accommodations checkout processes are disclosed. In some embodiments, the guest initiated checkout device comprises one of a button and a voice-activated device. In some embodiments, the guest initiated checkout device is conveniently located in guest accommodations for a guest to use when checking out and which initiates communication with a guest initiated accommodations checkout cloud service hosted by the guest initiated accommodations checkout system to send out communication to people and other systems informing them that guest checkout has commenced as triggered by activation of the guest initiated checkout device.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
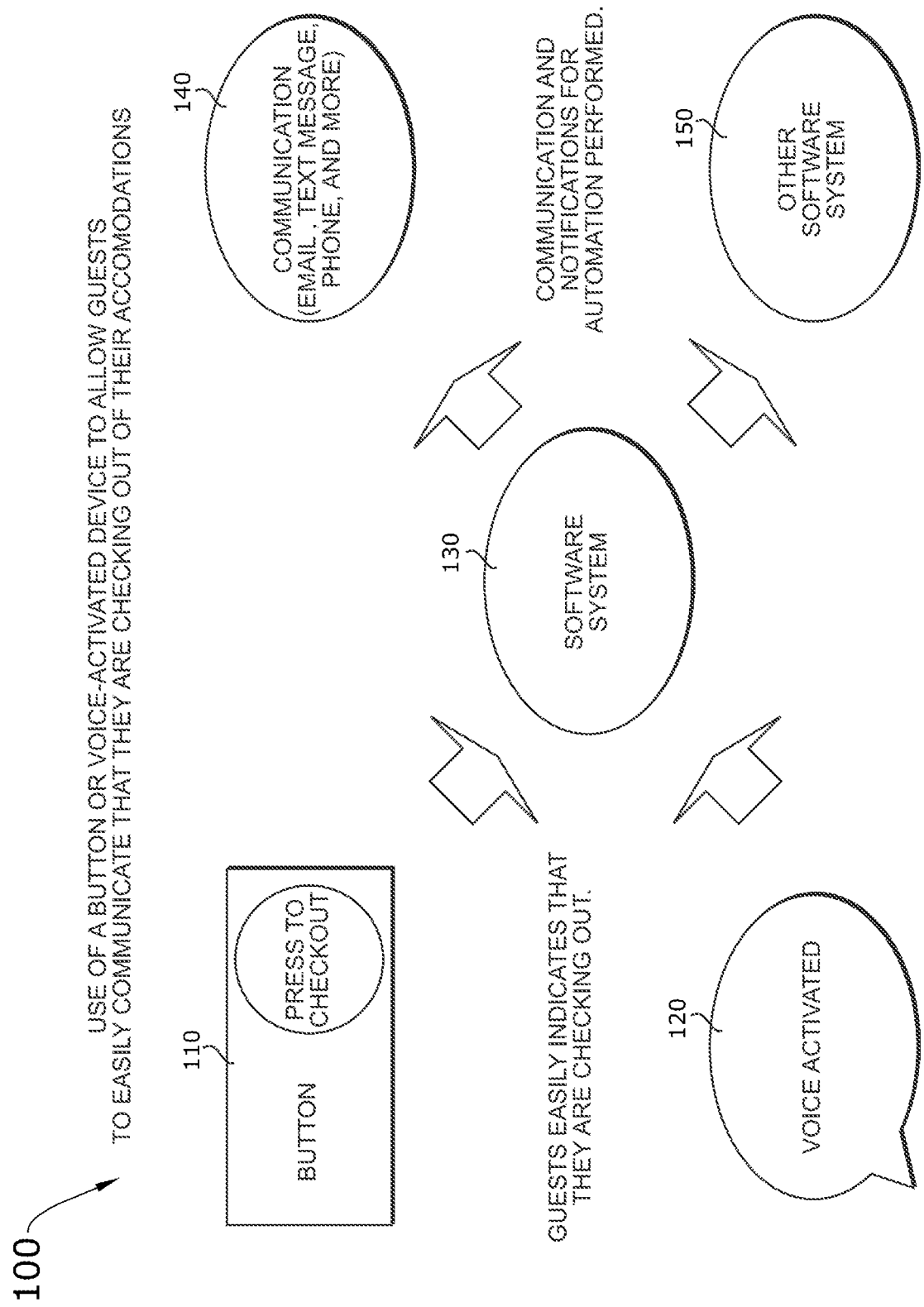
FIG. 1 conceptually illustrates a guest initiated accommodations checkout system in some embodiments that demonstrates use of a guest initiated checkout button device or a voice-activated guest initiated checkout device to allow guests to easily communicate that they are checking out of their accommodations.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel guest initiated checkout device, a guest initiated accommodations checkout system, and associated guest initiated accommodations checkout processes. In some embodiments, the guest initiated checkout device comprises one of a button and a voice-activated device. In some embodiments, the guest initiated checkout device is conveniently located in guest accommodations for a guest to use when checking out and which initiates communication with a guest initiated accommodations checkout cloud service hosted by the guest initiated accommodations checkout system to send out communication to people and other systems informing them that guest checkout has commenced as triggered by activation of the guest initiated checkout device.

As stated above, there are many activities (maintenance, cleaning, replenishing, etc.) which need to be performed after a guest's checkout of accommodations. In most cases, the personnel who perform these activities wait for the designated checkout time and have a small window to complete them before the next check in. To checkout of their accommodations, guests will either checkout formally at the checkout desk or in the expected manner or simply leave on the day of checkout at or before some designated checkout time. Activities that need to be performed after guests leave can be performed sooner when it is known that guests have checked out. However, guests often will not communicate when they are leaving their accommodations. For guests to be willing to help with communicating that they are leaving, it needs to be very easy for them. Embodiments of the guest initiated checkout device, the guest initiated accommodations checkout system, and the associated guest initiated accommodations checkout processes described in this specification solve such problems by providing a button or a voice-activated device that is conveniently located in guest accommodations for the guest to use when the guest is checking out of the guest accommodations, such that upon activation by the guest, the button or voice-activated device initiates communication with a back-end cloud-based software system to send out communication to people and other systems informing them that guest checkout has commenced, thereby allowing cleaners, maintenance workers, and other personnel that need to perform activities to be able to get started as soon as the guest has checked out. In addition to allowing the post-checkout personnel to get started as soon as the guest has checked out, this also allows other automation systems to kickoff.

Embodiments of the guest initiated checkout device, the guest initiated accommodations checkout system, and the associated guest initiated accommodations checkout processes described in this specification differ from and improve upon currently existing options. In particular, to checkout of accommodations today, guests either need to message someone, stop by a front desk, or just simply leave. The problem is that guests are often unsure where to go to check out, or what is required of them to check out. Many guests simply leave the accommodations without any checkout whatsoever, which leaves the host in a state of not knowing whether the guest has left or not. Most accommodation places wait until after checkout time for activities to be performed. This is problematic because it delays post-checkout actions that need to be performed by the host to prepare the accommodations for the arrival of the next guest. By contrast, the guest initiated checkout device, the guest initiated accommodations checkout system, and the associated guest initiated accommodations checkout processes of some embodiments provides an improvement on what currently exists by allowing hosts to start activities immediately after being notified that guest checkout has commenced via the guest activating the guest initiated checkout device, and thereby provide a way for those activities which need to be performed after the guest leaves to be performed sooner.

The guest initiated checkout device, the guest initiated accommodations checkout system, and the associated guest initiated accommodations checkout processes of the present disclosure may be comprised of the following elements. This list of possible constituent elements is intended to be exemplary only and it is not intended that this list be used to limit the guest initiated checkout device, the guest initiated accommodations checkout system, and the associated guest initiated accommodations checkout processes of the present application to just these elements. Persons having ordinary skill in the art relevant to the present disclosure may understand there to be equivalent elements that may be substituted within the present disclosure without changing the essential function or operation of the guest initiated checkout device, the guest initiated accommodations checkout system, and the associated guest initiated accommodations checkout processes.

1. Button (one embodiment of the guest initiated checkout device).

2. Voice-activated device (another embodiment of the guest initiated checkout device).

3. Software system (one or more software modules and databases of a back-end cloud-based guest initiated checkout cloud service that is hosted by the guest initiated accommodations checkout system).

4. Communication (networked communication between any and all guest initiated checkout devices and the cloud-based guest initiated checkout cloud service, as well as any other third party software and/or networked systems).

5. Other (third party) software and/or networked system(s).

The guest initiated checkout device, the guest initiated accommodations checkout system, and the associated guest initiated accommodations checkout processes of the present disclosure generally work by physical or audible interaction by the guest who triggers the guest initiated checkout device by pushing the button or audibly informing the voice-activated device of guest checkout. When the guest triggers the guest initiated checkout device, the button or voice-activated device automatically initiates a communication with the software system (#3) which acts as a central hub, and knows which guest initiated checkout device—including individual placements and mixtures of the button (#1) and voice-activated devices (#2)—corresponds to each accommodation. In addition, each accommodation is associated with a user-account, thereby allowing for configuration of rules and procedures to carry out for initiating checkout. In some embodiments, the rules defined in the user-account determine what further communication and actions should be taken after the guest initiated checkout device has been triggered/activated by the guest.

In some embodiments, the rules may be configured in the form of a protocol of steps to be completed, which considers various states of guest checkout via if-then logic. In some embodiments, the if-then logic is performed by the software system (#3) to determine which button (#1) or voice-activated device (#2) was triggered. From there, it reads users' settings to determine what communication (#4) should be sent out and what other software systems (#5) shall be invoked.

To make the guest initiated checkout device, the guest initiated accommodations checkout system, and the associated guest initiated accommodations checkout processes of the present disclosure, one may craft software that is able to receive notifications from a button or voice-activated device. The software may process this information and then perform the appropriate communication. The software system allows for efficient management of the flow of information. The button or voice-activated device enables a guest to kick off the communication. Either a communication channel or other software system is linked as the output from the software system. Although examples of the guest initiated checkout device described in this specification focus on either or both of an electronic button (with digital circuitry and network communications connectivity) and a voice-activated device (also with network communications connectivity), a person of ordinary skill in the relevant art would appreciate that other designs of the guest initiated checkout device could be conceived, implemented, and deployed for the guest to easily communicate that they are leaving.

To use the guest initiated checkout device, the guest initiated accommodations checkout system, and the associated guest initiated accommodations checkout processes of the present disclosure, an accommodation provider installs a button or a voice-activated device (or another guest initiated checkout device) in their accommodations. The accommodation provider then configures communication and other automation to be performed at the time of checkout (i.e., when the guest activates the button, the voice-activated device, or other guest initiated checkout device). The accommodation provider informs guests about the checkout protocol, which involves simply pressing the button for the guest initiated checkout button device, or audibly informing the voice-activated guest initiated checkout device, thereby providing the guest the ability to self-checkout when ready to check out of and depart the accommodations. The recipients of the communication begin performing their activities when notified of a checkout. Similarly, automated processes are triggered to automatically shut off lights, shut off air conditioning, lock doors, etc., upon departure of the guest (after the guest triggers the guest initiated checkout device).

By way of example, FIG. 1 conceptually illustrates a guest initiated accommodations checkout system 100 that demonstrates use of a guest initiated checkout button device or a voice-activated guest initiated checkout device to allow guests to easily communicate that they are checking out of their accommodations. As shown in this figure, the guest initiated accommodations checkout system 100 includes a guest initiated checkout button device 110, a voice-activated guest initiated checkout device 120, a software system 130, a plurality of communication types 140, and other software systems 150 that are notified by the software system 130 for performing automation activities after departure of a guest from their accommodations. Specifically, the guest initiated checkout button device 110 includes a button that a guest can press to initiate checkout from accommodations. In some embodiments, the guest initiated checkout button device 110 is an electronic digital device with electronic digital circuitry and includes network accessibility via a network card, a network communications chip, or a data network device or module. In this way, the guest initiated checkout button device 110 is able to transmit a signal to the software system 130 that the guest has initiated checkout by pressing the checkout button.

In some embodiments, the guest initiated accommodations checkout system 100 also supports a guest in easily indicating that he or she is checking out of the accommodations by way of the voice-activated guest initiated checkout device 120. Specifically, the voice-activated guest initiated checkout device 120 is an electronic device with network connectivity similar to the guest initiated checkout button device 110, which allows communication across the guest initiated accommodations checkout system 100. The voice-activated guest initiated checkout device 120 works by capturing audible commands and/or sounds and transforming the captured audible commands or sounds into digital signals that are transmitted over the network to the software system 130. The network connectivity for both of the guest initiated checkout button device 110 and the voice-activated guest initiated checkout device 120 can be hard-wired connectivity to a local network and out to the Internet, WiFi wireless connectivity, cellular communications connectivity, etc.

The guest initiated accommodations checkout system 100 includes the software system 130 as a central point of management over the entire system. In some embodiments, the software system 130 is a cloud-computing networked software-as-a-service (SaaS) that provides a guest initiated accommodations checkout platform to facilitate easy checkout by guests interacting with a guest initiated accommodations device and to manage communications and configurations of the entire system for one or more accommodations and deployed guest initiated accommodations devices, communication types, and automation systems. In some embodiments, the software system 130 includes a server computer that runs a web server software application and hosts the guest initiated accommodations checkout platform provided by the cloud-computing networked SaaS.

In some embodiments, the host of the accommodations can deploy the guest initiated checkout button device 110 or the voice-activated guest initiated checkout device 120 in the accommodations, and then configure the software system 130 to recognize the signals from the guest initiated checkout button device 110 or the voice-activated guest initiated checkout device 120. Specifically, the guest initiated checkout button device 110 and the voice-activated guest initiated checkout device 120 can transmit the checkout initiation signal to the software system 130 along with a unique identifier of the associated guest initiated checkout device. In some embodiments, each guest initiated checkout device has a unique identifier that is different from the unique identifiers of all other guest initiated checkout devices. In this way, the host of the accommodations can configure the software system 130 with information about the accommodations, such as address, number of rooms, automation details, and other specific information pertaining to checkout activities, and link such information for each individual accommodation with the unique identifier of the guest initiated checkout button device 110 or the voice-activated guest initiated checkout device 120 which is deployed at the accommodations.

In some embodiments, the plurality of communication types 140 supported by the guest initiated accommodations checkout system 100 include email, text message (SMS text), phone, and other such communication types that may be triggered when a guest initiates checkout by pressing the checkout button or activating the voice-activated device. In some embodiments, the software system 130 may be further configured to accept more than one type of communication for any particular accommodation. The software system 130 of some embodiments ranks the plurality of communication types 140 for each individual accommodation. For example, a particular accommodations may have a preferred communications type configuration as email, with a secondary communications type set for text message, followed by phone as a third (least preferred, in this example) communications type. In some embodiments, the software system 130 tries to communicate with the preferred communications type, unless there is a failure of communication detected, in which case the software system 130 tries the next preferred communications type, and so on. Along with the plurality of communication types 140 configured in the software system 130, the software system 130 of some embodiments also configures specific destination addresses or communication endpoints. For example, email may be a preferred communication type for a specific accommodations which has slow turnover, guest on guest, while having text messaging as a preferred communication type of a different accommodations in high demand, and which needs to be quickly cleaned and taken care of upon checkout by the former guest.

In addition to the plurality of communication types 140, the guest initiated accommodations checkout system 100 of some embodiments configures the software system 130 to kickoff one or more automation processes as any particular accommodations upon a guest departing after checkout is initiated by the guest via the guest initiated checkout device. In this figure, the automation processes are shown by other software systems 150. Importantly, the software system 130 would manage the automation features, if any, for any particular accommodations, and would trigger the corresponding notification to kick off the automation activity when the accommodations includes it. In this way, the guest's simple interaction with the guest initiated checkout button device 110 or the voice-activated guest initiated checkout device 120 informs the software system 130 of checkout, which allows communications and automation to proceed immediately.

Figure 2:
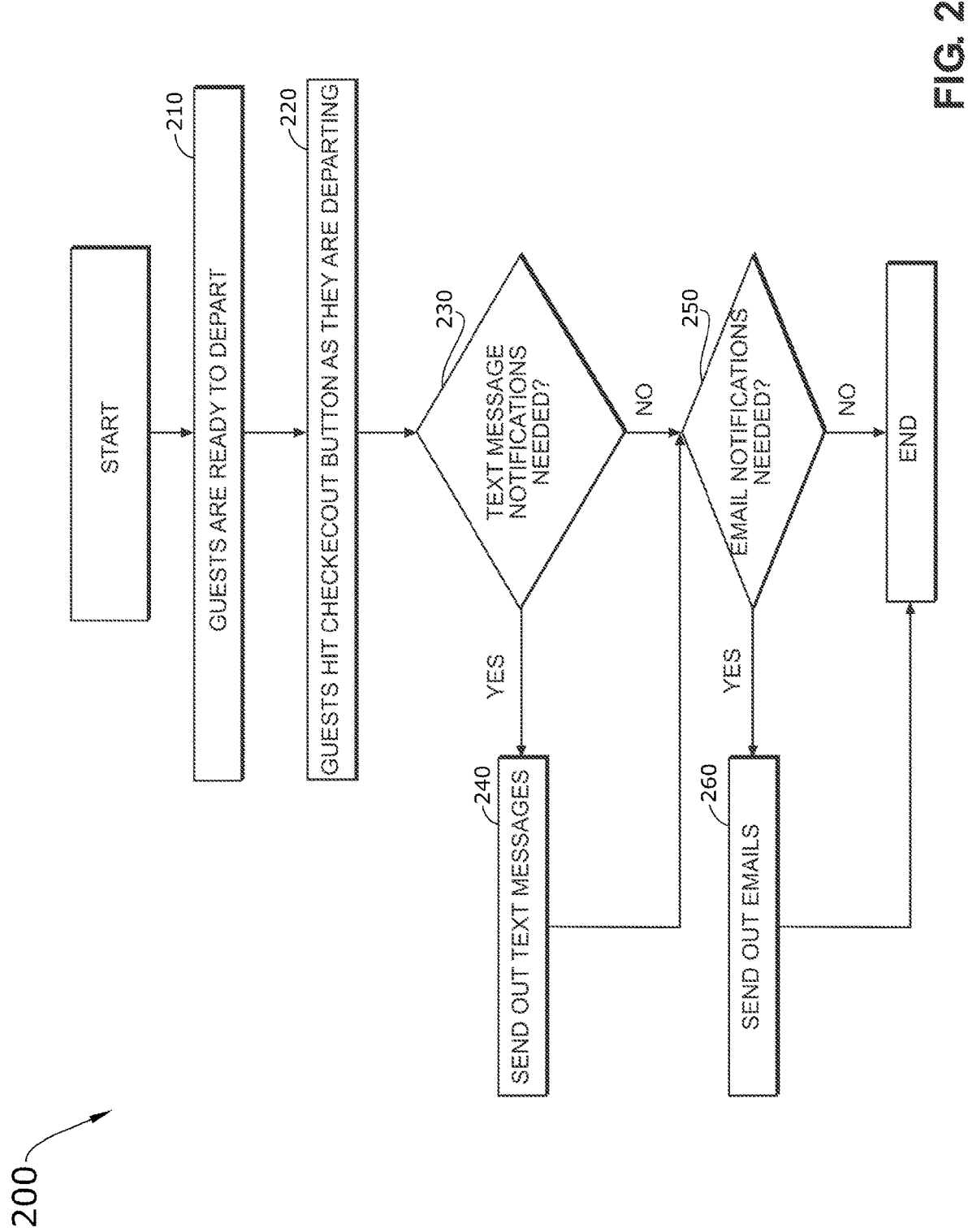
FIG. 2 conceptually illustrates a button-activated guest departure communications process for triggering guest departure notification communications by activation of the guest initiated accommodations checkout button device in some embodiments.

Turning to another example, FIG. 2 conceptually illustrates a button-activated guest departure communications process 200 for triggering guest departure notification communications by activation of the guest initiated accommodations checkout button device. In some embodiments, the button-activated guest departure communications process 200 is performed in part by the software system 130 described above by reference to FIG. 1. In this example, the guest initiated checkout device is a guest initiated checkout button device, and therefore, checkout is triggered by a guest pressing the button of the guest initiated checkout button device. As shown in this figure, the button-activated guest departure communications process 200 starts when a guest is or guests are ready to depart (at 210) from the accommodations in which the guest initiated checkout button device is placed. Next, the button-activated guest departure communications process 200 continues to the next step at which the guest/guests press the checkout button (at 220) while departing the accommodations.

As described above, pressing the button of the guest initiated checkout button device activates the guest initiated checkout button device to automatically transmit a signal to the software system indicating that the guest/guests are departing. The software system includes configuration information for the guest initiated checkout button device which is related to the specific accommodations in which the guest/guests were staying. At least one item in the configuration information for the specific accommodations is a preferred communications type. The preferred communications type may be the only communications type associated with the specific accommodations or may be one of several communications types, such as the plurality of communication types 140 described above by reference to FIG. 1. In some embodiments, the communication type to use for the specific accommodations is configured for multiple communication types are intended to all be triggered upon guest checkout. For example, the configuration of the communication types for the specific accommodations may include text messaging and email as required communication types to use upon guest checkout, with phone listed as an alternate communication type (or non-preferred communication type to use only if the preferred communication type(s) does not succeed).

In some embodiments, the button-activated guest departure communications process 200 continues with the software system determining (at 230) whether text message notifications are needed for the specific accommodations, now that the guest has indicated checkout and departure. When text message notifications are needed, the button-activated guest departure communications process 200 sends out the departure/checkout notifications via text messages (at 240) to the relevant parties upon checkout. For example, a text message may be sent to an owner or manager of the accommodations and another text message may be sent to a cleaning company or other personnel responsible to clean the accommodations and prepare for the next guest.

In some embodiments, the button-activated guest departure communications process 200 continues to the next step after either sending out the text message(s) to the required individual(s) or after determining that text message notifications are not needed. At the next step, the button-activated guest departure communications process 200 of some embodiments determines (at 250) whether email notifications are needed for the specific accommodations, now that the guest has indicated checkout and departure. For example, the specific accommodations may be configured to have two primary communication types—text message and email message—which both are sent to one or more recipients, such as the owner or manager and personnel responsible for cleaning the accommodations. Alternatively, the specific accommodations may be configured to have two primary communication types—text message and email message—but have only text message be send to the personnel for cleaning the accommodations, while sending an email message to the owner or manager. Other such variations may be configured for any given accommodations in which checkout activities are triggered by activation of the guest initiated checkout button device or voice-activated guest initiated checkout device.

When email notifications are determined (at 250) to be needed, then the button-activated guest departure communications process 200 sends out email (at 260) which includes one or more email message(s) to the noted recipients, such as the owner or manager and clean-up personnel or other parties who may be utilized in post-checkout accommodations clean-up or preparation activities. Then the button-activated guest departure communications process 200 ends.

Figure 3:
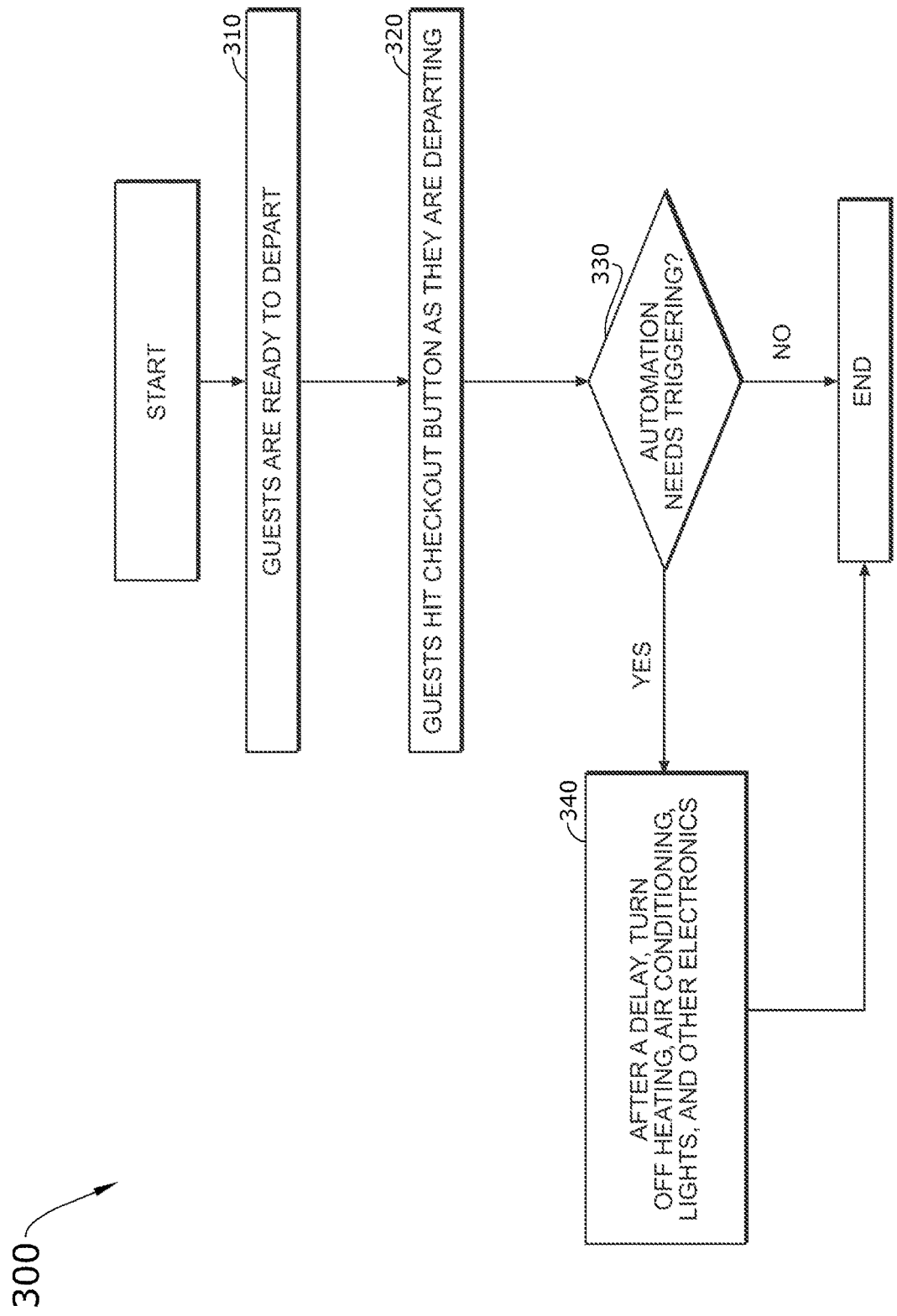
FIG. 3 conceptually illustrates a button-activated guest departure automation process for triggering post-departure automation activities by activation of the guest initiated accommodations checkout button device in some embodiments.

Referring to a different example, FIG. 3 conceptually illustrates a button-activated guest departure automation process 300 for triggering post-departure automation activities by activation of the guest initiated accommodations checkout button device.

In some embodiments, the button-activated guest departure automation process 300 is performed in part by the software system 130 described above by reference to FIG. 1. As shown in this figure, the button-activated guest departure automation process 300 starts when a guest is ready to depart (at 310) from the accommodations. Next, the button-activated guest departure automation process 300 continues to the next step at which the guest presses the checkout button (at 320) while departing the accommodations. As described above, pressing the button of the guest initiated checkout button device activates the guest initiated checkout button device to automatically transmit a signal to the software system indicating that the guest/guests are departing. Beyond the communication types and list of recipients configured for the specific accommodations, the software system also includes configuration information for any automation devices/processes at the specific accommodations. For example, the accommodations may include lights that are associated with an automated controller for turning on/off the lights, air conditioning which can be automated to shut down after guests depart, resetting smart television accounts for pair services to wipe clean any guest login information, other IoT/smart device settings made by the guest to automatically reset to default setting (e.g., setting a default temperature for the refrigerator, another temperature for the freezer, resetting dishwasher default settings, laundry machine settings, etc.), and any other remotely configurable automation-ready smart devices.

In some embodiments, the button-activated guest departure automation process 300 continues with the software system determining (at 330) whether automation needs to be triggered to kick start automation processes at the accommodations, now that the guest has indicated checkout and departure. When automation needs to be triggered to kickstart automation processes for automated devices and systems at the specific accommodations, the button-activated guest departure automation process 300 of some embodiments waits for a delay period after the checkout was initiated by the guest pressing the checkout button, and, after the delay period expires, starts the configured automation processes associated with automated devices/systems at the accommodations (at 340). In some embodiments, the automation processes are started remotely by the software system. To start remotely, the button-activated guest departure automation process 300 includes steps for the software system to send appropriate command signals over the Internet to at internet protocol (IP) address of the accommodations, and to the specific sub-domain, local IP addresses of the smart devices/IoT systems deployed and operating at the specific accommodations. For example, the software system may send a specific command to a particular home automation thermostat ("Nest®") controller that is configured to control lights in the accommodations, such that the lights are all triggered to be turned off, if the guest left any of them turned on, and similarly may send other commands to the Nest® controller to reset the climate control HVAC/air conditioning to some specified temperature, as well as sending other commands to other such automation control devices which may be deployed at the accommodations to control smart devices/automated IoT devices, such as laundry machines, dishwashers, refrigerators, etc. Then the button-activated guest departure automation process 300 ends.

While the button-activated guest departure communications process 200, described above by reference to FIG. 2, and the button-activated guest departure automation process 300, described above by reference to FIG. 3, relate to processes for initiating checkout by the guest pressing the guest initiated checkout button device, in some embodiments, the guest is able to initiate checkout by audibly informing a voice-activated guest initiated checkout device of their intention to depart the accommodations. A process for initiating checkout by audibly informing a voice-activated guest initiated checkout device and performing the required/configured checkout activities in response to the audibly triggered checkout signal is described next.

Figure 4:
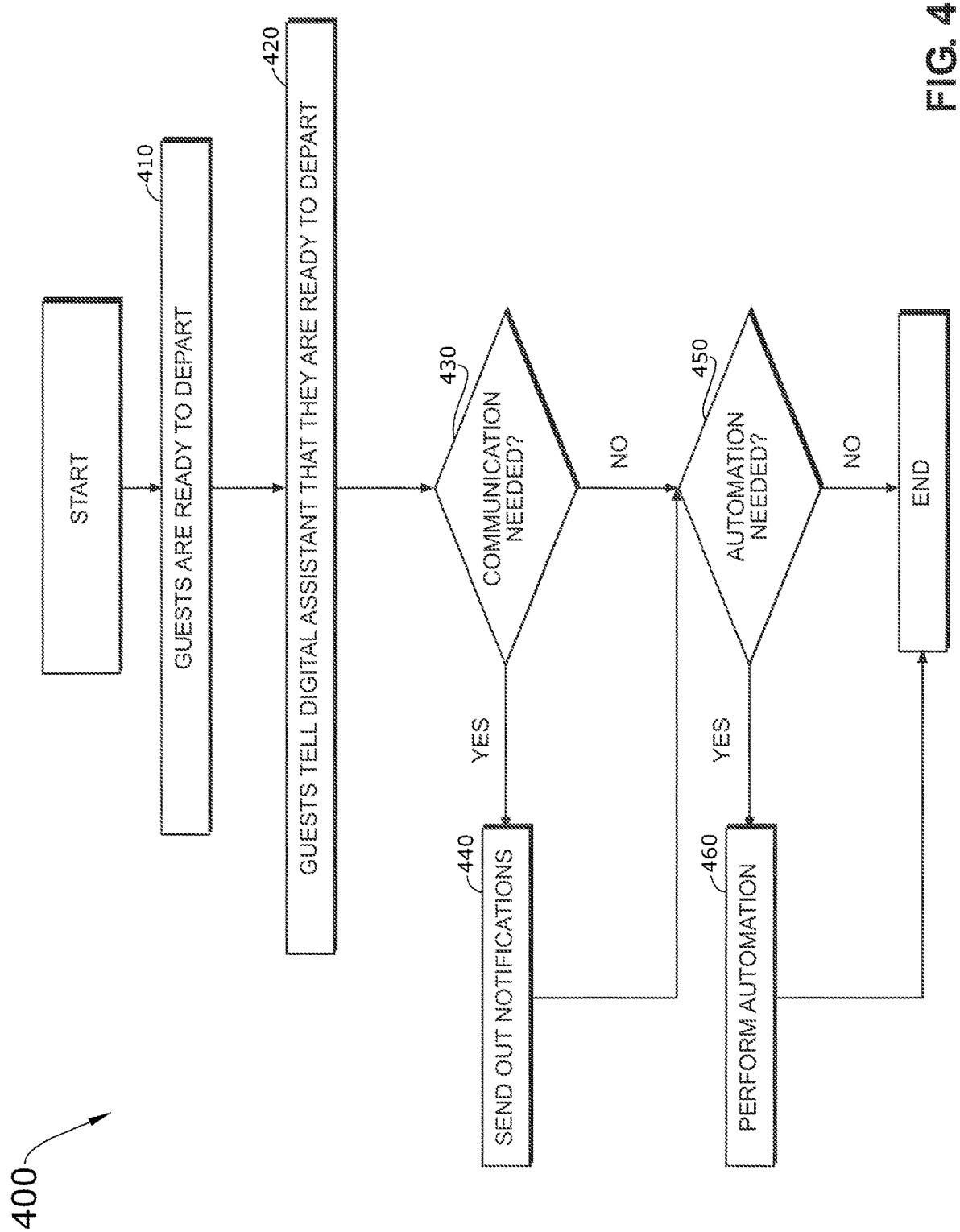
FIG. 4 conceptually illustrates a voice-activated guest departure process for triggering guest checkout notification communications and post-departure automation activities by audible activation of the voice-activated guest initiated accommodations checkout device in some embodiments.

By way of example, FIG. 4 conceptually illustrates a voice-activated guest departure process 400 for triggering guest checkout notification communications and post-departure automation activities by audible activation of the voice-activated guest initiated accommodations checkout device. As shown in this figure, the voice-activated guest departure process 400 starts as the guests are ready to depart (at 410) from the accommodations. The voice-activated guest departure process 400 continues to the steps at which the guests audibly tell a digital voice-activated assistant that they are ready to depart from the accommodations (at 420). In some embodiments, the voice-activated guest departure process 400 then determines (at 430) which communication is needed for post-checkout parties to be informed of the guests' departure from the accommodations. When the voice-activated guest departure process 400 determines the communication types to use and the recipients to receive the communications, notifications are then sent out as specified in the configuration settings for the accommodations (at 440). Next, the voice-activated guest departure process 400 determines whether automation needs to be triggered at the accommodations (at 450). When automation configuration information is determined, the voice-activated guest departure process 400 sends the commands to have the required automation processes performed by the associated automated devices/IoT systems at the accommodations. Then the voice-activated guest departure process 400 ends.

The voice-activated guest departure process 400 includes several steps that are similar to related/corresponding steps in the button-activated guest departure communications process 200, described above by reference to FIG. 2, and the button-activated guest departure automation process 300, described above by reference to FIG. 3, because the cloud-based software system (cloud service and platform), as described above by reference to FIG. 1, performs much of the management of the automation and directs traffic, orders, and transmits communication between the various recipients and parties, regardless of whether the checkout is initiated by a voice-activated guest initiated checkout device or a guest initiated checkout button device. Thus, a person of ordinary skill in the relevant art would appreciate that the button-activated guest departure communications process 200, described above by reference to FIG. 2, the button-activated guest departure automation process 300, described above by reference to FIG. 3, and the voice-activated guest departure process 400, described above by reference to FIG. 4, are exemplary processes and not intended to limit the understanding and description of the invention.

Additionally, many of the above-described features, applications, and systems are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
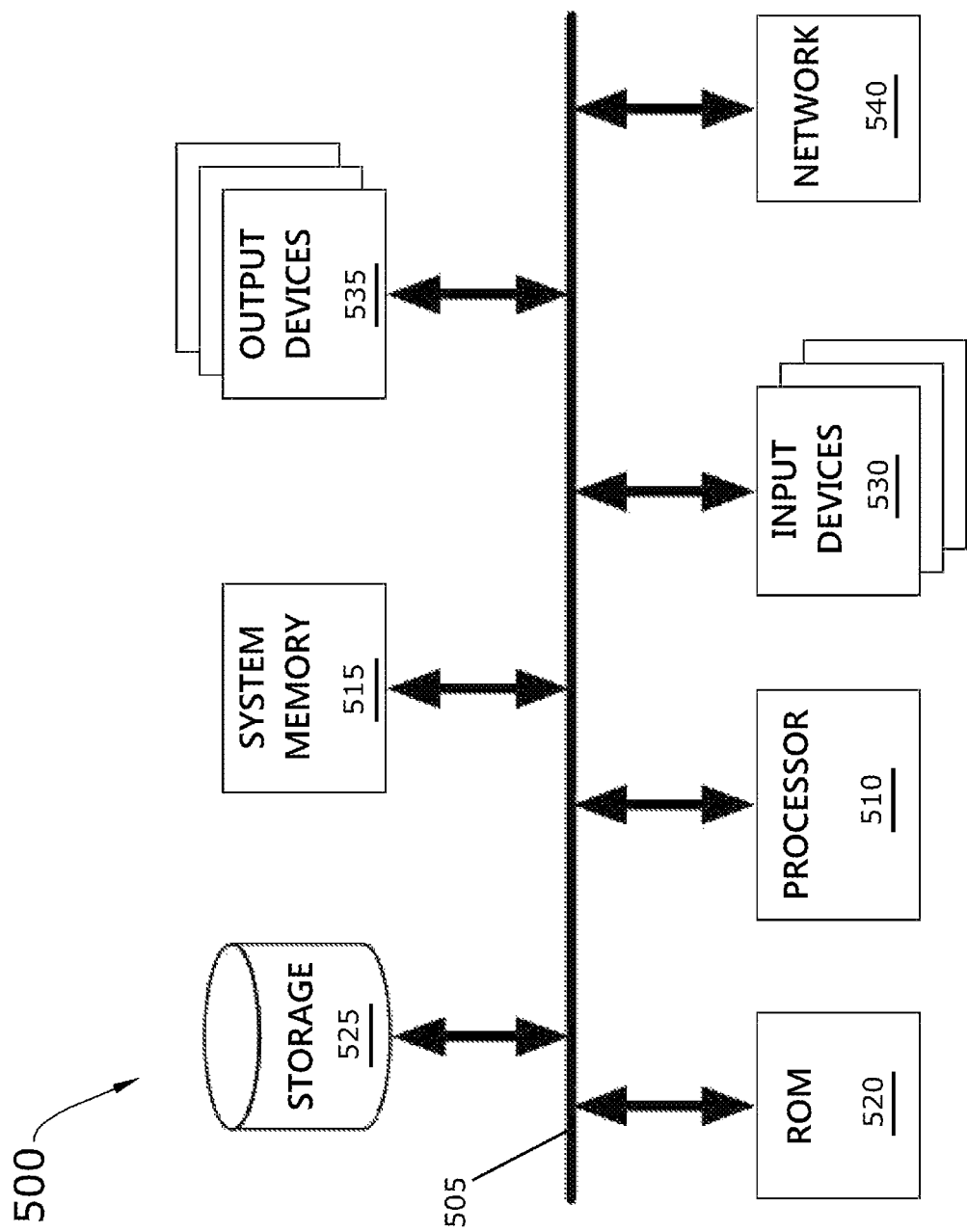
FIG. 5 conceptually illustrates an electronic system with which some embodiments of the invention are implemented.

FIG. 5 conceptually illustrates an electronic system 500 with which some embodiments of the invention are implemented. The electronic system 500 may be an electronic button with digital circuitry, a voice-activated device, a computer, a server, a phone (cell phone, mobile phone, smartphone, etc.), another handheld computing device, an Internet of Things ("IoT") device, etc., or any other sort of electronic device or computing device. Such an electronic system includes various types of computer readable media and interfaces for various other types of computer readable media. Electronic system 500 includes a bus 505, processing unit(s) 510, a system memory 515, a read-only 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only 520. For example, the various memory units include instructions for processing appearance alterations of displayable characters in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as cathode ray tubes (CRT) or liquid crystal displays (LCD). Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 2-4 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Thus, one of ordinary skill in the art would understand that the invention is not to be limited by the foregoing illustrative details, but rather is to be defined by the appended claims.

I claim:

1. A guest initiated accommodations checkout process for a guest to checkout of accommodations by way of a guest initiated checkout device, said guest initiated accommodations checkout process comprising:

receiving a checkout signal from a guest initiated checkout device deployed at a particular accommodations from which a guest is departing;

identifying a recipient to inform of the particular accommodations checkout by the guest;

determining a type of communication to use to inform the recipient of the particular accommodations checkout by the guest;

using the type of communication to transmit to the recipient a notification to inform the recipient of the particular accommodations checkout by the guest;

triggering post-checkout automation at the particular accommodations;

starting, by a corresponding automated smart device, an automation process when post-checkout automation at the particular accommodations is triggered;

after the automation process is started, automatically resetting by the corresponding automated smart device: (i) login settings for a smart television account for accessing paired services by the guest at the particular accommodations to default login settings for the smart television account, and (ii) settings configured by the guest at the particular accommodations to default settings for a plurality of other remotely configurable automation-ready smart devices comprising a smart refrigerator, a smart freezer, a smart dishwasher, and a smart laundry machine; wherein settings of each device in the plurality of other remotely configurable automation-ready smart devices are reset to default settings after the automation process is started; wherein, a refrigerator temperature setting in the settings of the smart refrigerator is reset to a default refrigerator temperature setting after the automation process is started; wherein a freezer temperature setting in the settings of the smart freezer is reset to a default freezer temperature setting after the automation process is started; wherein the settings of the smart dishwasher are reset to default settings after the automation process is started; wherein the settings of the smart laundry machine are reset to default settings after the automation process is started; and turning off power, by the corresponding automated smart device, of heating, air conditioning, and lights at the particular accommodations, and the plurality of other remotely configurable automation-ready smart devices after the automation process is started.

2. The guest initiated accommodations checkout process of claim 1, wherein the guest initiated checkout device comprises a guest initiated checkout button device.

3. The guest initiated accommodations checkout process of claim 2, wherein the checkout signal is triggered by the guest pressing a button of the guest initiated checkout button device.

4. The guest initiated accommodations checkout process of claim 1, wherein the guest initiated checkout device comprises a voice-activated guest initiated checkout device.

5. The guest initiated accommodations checkout process of claim 4, wherein the checkout signal is triggered by the guest audibly telling the voice-activated guest initiated checkout device of an intention to depart and checkout of the particular accommodations.

6. The guest initiated accommodations checkout process of claim 1 further comprising waiting, by the corresponding automated smart device, for expiration of a delay period after the button of the guest initiated checkout button device is pressed, before starting the automation process.

7. The guest initiated accommodations checkout process of claim 1, wherein the type of communication to use to inform the recipient of the particular accommodations checkout by the guest comprises text message notification.

8. The guest initiated accommodations checkout process of claim 1, wherein the type of communication to use to inform the recipient of the particular accommodations checkout by the guest comprises email message notification.

* * * * *